United States Patent Office 3,077,404
Patented Feb. 12, 1963

3,077,404
COUMARONE DERIVATIVES AND USE THEREOF
Emanuel M. Bickoff, Berkeley, Arvin L. Livingston, Martinez, and Albert N. Booth, Berkeley, Calif., assignors to the United States of America as represented by the Secretary of Agriculture
No Drawing. Original application Apr. 28, 1961, Ser. No. 106,412, now Patent No. 3,027,382, dated Mar. 27, 1962. Divided and this application July 26, 1961, Ser. No. 131,044
7 Claims. (Cl. 99—2)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of application Serial No. 106,412, filed April 28, 1961, now Patent No. 3,027,382.

This invention relates to and has among its objects the provision of new coumarone derivatives, methods of synthesizing these compounds, animal feeds and other compositions containing these compounds, and methods for producing and utilizing such compositions. Further objects of the invention will be evident from the following description wherein parts and percentages are by weight unless otherwise specified.

The compounds which are the subject of this invention are the salts of 2-(2,4-dihydroxyphenyl)-6-hydroxy-coumarone-3-carboxylic acid. These compounds may also be termed salts of 2-(2,4-dihydroxyphenyl)-6-hydroxy-benzofuran-3-carboxylic acid. The compounds have the formula

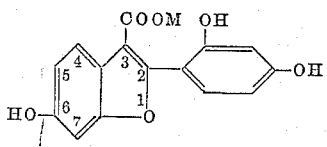

wherein M represents a cation, for example, Na, K, ½ Ca, ½ Mg, ⅓ Al, or the like. Generally it is preferred to prepare and use the compounds in the form of the alkali-metal salts as these are water-soluble and readily prepared.

The compounds of the invention may be prepared from coumestrol by application of mild hydrolytic conditions as is conventional in opening the lactone ring in compounds containing such structure. A typical example of such procedure involves contacting coumestrol with a dilute solution of alkali in an alcohol. In this way, the lactone ring of the coumestrol is opened with formation of the corresponding salt of 2-(2,4-dihydroxyphenyl-6-hydroxy-coumarone-3-carboxylic acid. Other salts may be prepared from this alkali-made salt by conventional metathetical reactions. The hydrolytic procedure is illustrated by the following formulas:

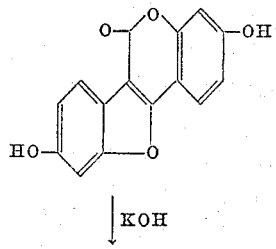

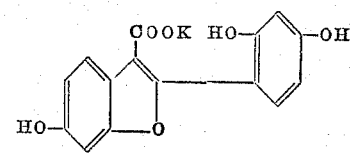

The preparation of coumestrol is described in Patents 2,884,427 and 2,890,116.

The compounds which are the subject of this invention (hereinafter referred to for brevity as the coumarone derivatives) are valuable estrogenic agents. Thus the coumarone derivatives exhibit essentially the same degree of estrogenic activity as coumestrol and may be employed in analogous manner in animal husbandry. Moreover, the coumarone derivatives have the advantage that they are more stable than coumestrol and their alkali-metal salts are water-soluble.

The fact that the coumarone derivatives exhibit essentially the same estrogenic properties as coumestrol could not have been foretold in view of the substantial difference in structure of the respective compounds; that is, the closed lactone ring structure of coumestrol and the open carboxyl and hydroxyl groups in the present coumarone derivatives. In a matter so complex as a physiological effect on animals, it would have been expected that opening of the lactone ring would fundamentally alter the physiological response. This situation is demonstrated by the fact that when derivatives of coumestrol were made wherein the furan ring was opened, the resulting compounds were essentially devoid of estrogenic activity.

A typical method of preparing the compounds of the invention is demonstrated in the following illustrative example.

*Example I*

Twenty-seven parts of coumestrol was dissolved in about 1000 parts of 1% KOH in methanol. The solution was warmed for 3 minutes on a steam bath. The resulting solution of the potassium salt of 2-(2,4-dihydroxyphenyl)-6-hydroxy-coumarone-3-carboxylic acid may be used as a source of said compound or it may be evaporated under vacuum to obtain the salt in solid form.

The estrogenic activity of the coumarone derivatives of the invention is illustrated by the following example:

*Example II*

Estrogenic assays were conducted by feeding one lot of immature female mice with a basal ration containing the potassium salt of 2-(2,4-dihydroxyphenyl)-6-hydroxy-coumarone-3-carboxylic acid. Another lot of the mice were fed the basal ration containing coumestrol. Each lot of mice contained 5 animals. In these tests each mouse was supplied with 10 grams of basal ration containing 0.3 or 0.75 mg. of the test compound and when this feed had been completely consumed (5–6 days) the feeding period was complete. A control lot of 5 animals were fed 10 grams of the basal ration, per se.

The basal ration had the following ingredients.

Ingredient: Proportion, percent
- Corn meal _____ 75
- Linseed oil cake _____ 10
- Crude casein _____ 10
- Codliver oil _____ 3
- Bone ash _____ 1.5
- Sod. chloride _____ 0.5

After the feeding period was completed, the animals were sacrificed and their uteri were excised and weighed. An increase in uterine weight denotes estrogenic activity in the material under test, the greater the increase in uterine weight over the control, the more potent the material tested.

The results of the assays are set forth below:

| Material Tested | Amount Fed, mg. per mouse | Average Uterine Weight, mg. |
|---|---|---|
| Potassium salt of 2-(2,4-dihydroxyphenyl)-6-hydroxycoumarone-3-carboxylic acid | 0.75 | 86.5 |
| Do | 0.3 | 27.0 |
| Coumestrol | 0.75 | 90 |
| Do | 0.3 | 25 |
| Control (basal ration) | | 9 |

It is well known in the field of animal husbandry that it is often desirable to provide animals with estrogenic preparations particularly for the purpose of increasing weight gain and increasing efficiency of feed utilization. Such effects can be obtained as well known in the art by adding to the regular diet a minor proportion of diethylstilbestrol. Also, estrogenic agents such as diethylstilbestrol can be implanted subcutaneously in animals to obtain the desired effects. The coumarone derivatives of the invention display estrogenic properties and can be employed in place of known estrogenic compounds, as in feeds or in subcutaneous implantation, to accomplish like results of accelerating weight gain and increasing the proportion of flesh produced per pound of feed. The coumarone derivatives constitute a source of high and uniform estrogenic potency. As a consequence they can be administered to animals in controlled dosages to obtain predetermined physiological responses. Problems of low estrogenic concentration and variable estrogenic activity as encountered in direct feeding of forage containing natural estrogenic principles are completely obviated. Moreover, administration of the coumarone derivatives does not involve any physical difficulty of feeding because they can be administered in feeds or other compositions the ingredients of which can be selected to be compatible with the digestive systems or other characteristics of the animals in question. Also, the coumarone derivatives can be administered by subcutaneous implantation or other techniques which require an active material free from extraneous components. Another point is that the coumarone derivatives are free from growth-inhibiting factors, saponins, or other detrimental agents naturally present in forage materials. Consequently, administration of the compounds to animals yields the useful results of attaining desired physiological response without any undesired side effects such as growth inhibition, bloating, etc.

The coumarone derivatives of the invention may be employed in animal husbandry in the same manner as conventional with diethylstilbestrol and other known estrogenic agents. Thus the compounds may be administered by incorporating them in conventional feeds; by addition to water or other fluid; by addition to grit fed to birds; by administration in capsules, pellets or by injection; by implantation of pellets, and so forth. The amount of the compounds to be administered will, of course, vary depending on the type of animal, the body weight thereof, the physiological response desired, and the mode of administration. For example, where the coumarone derivatives are administered in admixture with a feed, dosage may be that physiologically equivalent to about from 0.01 to 8 milligrams of diethylstilbestrol per 100 lbs. of body weight per day. Generally it is preferred to administer the coumarone derivatives by incorporating them in a conventional feed. Thus the feed may consist mainly of vegetable material such as corn, wheat, barley, milo, hay, dehydrated alfalfa or other forage material, soybean meal, cottonseed meal, distillers' grains, peanut meal, oat hulls, bran, corn stalks, corn cobs, sorghum, beet pulp, or the like. For a high-energy diet a major proportion of grain or oil-seed meal is preferred. In addition to the main vegetable portion, the feed may contain the usual supplements such as mineral salts, vitamin preparations, fish meal, fish oil, linseed oil, antibiotic supplements, and so forth. In general the feed may contain on the order of 0.001 to 1 lb. of the coumarone derivative per ton of feed. The coumarone derivatives may be applied for example to chickens, turkeys, geese, ducks, swine, sheep, cattle, horses, and so forth. Thereby, important practical effects are gained including increased rate of gain and increased efficiency of feed utilization.

As noted above, the invention is of particularly practical value as applied to animals, such as steers, which are grown primarily for meat. Thus by application of the teachings of the invention, the animals are caused to gain weight more rapidly and produce more flesh per unit weight of feed with resulting economic benefits.

Having thus described the invention, what is claimed is:

1. A method of stimulating the growth of animals which comprises administering to the animals a physiologically adequate amount of a salt of 2-(2,4-dihydroxyphenyl)-6-hydroxy-coumarone-3-carboxylic acid.

2. A method of stimulating the growth of animals which comprises supplying the animals with a diet containing a physiologically adequate amount of an alkali-metal salt of 2-(2,4-dihydroxyphenyl)-6-hydroxy-caumarone-3-carboxylic acid.

3. The method of stimulating the growth of animals which comprises supplying the animals with a diet containing a major proportion of edible vegetable material and a minor proportion of an alkali-metal salt of 2-(2,4-dihydroxyphenyl) - 6 - hydroxy - coumarone-3-carboxylic acid, the proportion of the latter being sufficient to cause the animals to gain weight more rapidly and with consumption of less feed than would be the case were the animals supplied the vegetable material alone.

4. An animal feeding composition comprising a major proportion of a nontoxic, ingestible carrier material and a minor but physiologically adequate proportion of a salt of 2-(2,4-dihydroxyphenyl)-6-hydroxy-coumarone-3-carboxylic acid.

5. An animal feed comprising a major proportion of edible vegetable material and a minor but physiologically adequate proportion of an alkali-metal salt of 2-(2,4-dihydroxyphenyl)-6-hydroxy-coumarone - 3 - carboxylic acid.

6. A method of increasing the dietary value of an animal feeding preparation containing mainly nontoxic, ingestible carrier material which comprises adding to the preparation a minor but physiologically adequate proportion of a salt of 2-(2,4-dihydroxyphenyl)-6-hydroxy-coumarone-3-carboxylic acid.

7. A method of increasing the dietary value of an animal feed containing mainly edible vegetable material which comprises adding to said feed a minor but physiologically adequate amount of an alkali-metal salt of 2-(2,4-dihydroxyphenyl)-6-hydroxy-coumarone - 3 - carboxylic acid.

No references cited.